US012634558B2

(12) United States Patent
Lindström

(10) Patent No.: US 12,634,558 B2
(45) Date of Patent: *May 19, 2026

(54) SNAPPING TO SEEK POSITIONS IN MEDIA CONTENT USING SEEK GUIDES

(71) Applicant: Spotify AB, Stockholm (SE)

(72) Inventor: Erik Johan Curcio Lindström, Stockholm (SE)

(73) Assignee: Spotify AB, Stockholm (SE)

( * ) Notice: Subject to any disclaimer, the term of this patent is extended or adjusted under 35 U.S.C. 154(b) by 128 days.

This patent is subject to a terminal disclaimer.

(21) Appl. No.: 18/455,828

(22) Filed: Aug. 25, 2023

(65) Prior Publication Data

US 2025/0071381 A1    Feb. 27, 2025

(51) Int. Cl.
| | |
|---|---|
| *G06F 3/04855* | (2022.01) |
| *G06F 3/0485* | (2022.01) |
| *G06F 3/04883* | (2022.01) |
| *H04N 21/472* | (2011.01) |
| *H04N 21/845* | (2011.01) |

(52) U.S. Cl.
CPC ... *H04N 21/47217* (2013.01); *G06F 3/04855* (2013.01); *G06F 3/04883* (2013.01); *H04N 21/8456* (2013.01); *G06F 3/0485* (2013.01)

(58) Field of Classification Search
CPC .............. G06F 3/0485; G06F 3/04855; H04N 21/47217
See application file for complete search history.

(56) References Cited

U.S. PATENT DOCUMENTS

| | | | | |
|---|---|---|---|---|
| 7,197,759 B2 * | 3/2007 | Barrett | ................. | H04N 21/482 |
| | | | | 715/830 |
| 7,451,469 B2 * | 11/2008 | Barrett | ................... | H04N 21/47 |
| | | | | 725/39 |
| 7,634,791 B2 * | 12/2009 | Barrett | ................. | H04N 21/482 |
| | | | | 725/39 |
| 8,832,589 B2 * | 9/2014 | Zhai | ...................... | G06F 3/0237 |
| | | | | 345/173 |
| 9,110,562 B1 * | 8/2015 | Eldawy | .............. | H04N 21/8456 |
| 9,189,472 B2 * | 11/2015 | Medlock | ............... | G06F 40/274 |
| 9,262,076 B2 * | 2/2016 | Townsend | ........... | G06F 3/04886 |

(Continued)

OTHER PUBLICATIONS

Shaun Turney; "Probability Distribution | Formula, Types, & Examples"; Published on Jun. 9, 2022, 18 pages, https://www.scribbr.com/statistics/probability-distributions/ (Year: 2022).*

(Continued)

*Primary Examiner* — Benjamin Smith
(74) *Attorney, Agent, or Firm* — McDonnell Boehnen Hulbert & Berghoff LLP

(57)    ABSTRACT

Systems and methods for snapping to seek positions in media content using seek guides are provided. Seek guides may be associated with a media content item. Each seek guide may have a position and a radius. When a user seeks to a reference position, a seek guide selector may select a seek guide to use in setting a new playback position. The seek guide selector may use a probabilistic distribution positioned based on the reference position to select a seek guide. Probabilities may be calculated for each seek guide using a cumulative distribution function, and a seek guide may be selected based on the calculated probabilities.

18 Claims, 9 Drawing Sheets

(56) References Cited

U.S. PATENT DOCUMENTS

| | | | |
|---|---|---|---|
| 9,384,185 B2 * | 7/2016 | Medlock | G06F 3/0236 |
| 9,423,951 B2 * | 8/2016 | Deutsch | G06F 3/04817 |
| 9,479,836 B2 | 10/2016 | Adimatyam et al. | |
| 9,485,543 B2 * | 11/2016 | Bayer | G06F 9/453 |
| 9,632,685 B2 * | 4/2017 | Li | H04N 21/414 |
| 9,699,488 B2 * | 7/2017 | Köser | H04N 21/435 |
| 9,767,076 B2 * | 9/2017 | Mellor | G06F 16/957 |
| 9,965,136 B1 * | 5/2018 | Brichter | G06F 3/0485 |
| 9,996,157 B2 * | 6/2018 | Chaudhri | G06F 3/016 |
| 10,019,146 B2 * | 7/2018 | Clark | G06F 3/0483 |
| 10,025,427 B2 * | 7/2018 | Cheong | G06F 3/03545 |
| 10,037,319 B2 * | 7/2018 | Medlock | G06F 3/0237 |
| 10,133,439 B1 * | 11/2018 | Brichter | G06F 3/04883 |
| 10,139,909 B2 * | 11/2018 | Chaudhri | G06F 3/04883 |
| 10,334,326 B2 * | 6/2019 | Tegethoff | H04N 21/47217 |
| 10,359,847 B2 * | 7/2019 | Mardirossian | G06F 3/04886 |
| 10,362,354 B2 * | 7/2019 | Panchaksharaiah | H04N 21/4333 |
| 10,489,012 B1 * | 11/2019 | Brichter | G06F 3/0481 |
| 10,503,387 B2 * | 12/2019 | Metz | G06F 3/0485 |
| 10,606,461 B1 * | 3/2020 | Eldawy | G11B 27/102 |
| 10,656,820 B2 * | 5/2020 | Clark | G06F 3/0485 |
| 10,802,710 B2 * | 10/2020 | Osborne | G06F 40/274 |
| 10,872,203 B2 * | 12/2020 | Orr | G06F 3/0237 |
| 10,911,835 B2 * | 2/2021 | Naik Raikar | H04N 21/2387 |
| 10,976,913 B2 * | 4/2021 | Monibi | G06F 3/04883 |
| 11,073,979 B2 * | 7/2021 | Augustine | G06F 3/04847 |
| 11,182,178 B1 * | 11/2021 | Singh | G06F 9/451 |
| 11,523,167 B2 * | 12/2022 | Coenen | G06F 3/03547 |
| 11,630,562 B2 * | 4/2023 | Walker | G06F 3/0486 715/723 |
| 11,782,980 B1 * | 10/2023 | Aronoff | G06F 3/0488 707/738 |
| 12,033,669 B2 * | 7/2024 | Walker | G11B 27/031 |
| 12,119,028 B2 * | 10/2024 | Bai | G10L 15/26 |
| 12,125,501 B2 * | 10/2024 | Caba Heilbron | G11B 27/031 |
| 12,154,242 B1 * | 11/2024 | Thivierge | G06T 19/20 |
| 2006/0031881 A1 * | 2/2006 | Barrett | H04N 21/482 725/45 |
| 2007/0143793 A1 * | 6/2007 | Barrett | H04N 21/4532 725/43 |
| 2012/0174005 A1 * | 7/2012 | Deutsch | G06F 3/04817 715/764 |
| 2012/0223889 A1 * | 9/2012 | Medlock | G06F 40/274 345/173 |
| 2013/0067332 A1 * | 3/2013 | Greenwood | G06F 3/0485 715/720 |
| 2013/0067382 A1 * | 3/2013 | Townsend | G06F 3/04886 715/773 |
| 2013/0253912 A1 * | 9/2013 | Medlock | G06F 40/205 704/9 |
| 2014/0201671 A1 * | 7/2014 | Zhai | G06F 40/284 715/773 |
| 2014/0258854 A1 * | 9/2014 | Li | H04N 21/414 715/702 |
| 2014/0281932 A1 * | 9/2014 | Mellor | G06F 3/0484 715/243 |
| 2014/0282739 A1 * | 9/2014 | Augustine | H04N 21/4312 725/52 |
| 2014/0351741 A1 * | 11/2014 | Medlock | G06F 3/04886 704/9 |
| 2015/0350735 A1 * | 12/2015 | Köser | H04N 21/2743 725/37 |
| 2015/0378510 A1 * | 12/2015 | Cheong | G06F 3/04812 345/178 |
| 2016/0070429 A1 * | 3/2016 | Clark | G06F 3/0482 715/784 |
| 2016/0357382 A1 * | 12/2016 | Metz | G06F 3/04883 |
| 2017/0169811 A1 | 6/2017 | Sabbavarapu et al. | |
| 2017/0185260 A1 * | 6/2017 | Mardirossian | H04N 21/4316 |
| 2017/0192671 A1 * | 7/2017 | Osborne | G06F 3/0236 |
| 2017/0357319 A1 * | 12/2017 | Chaudhri | H04M 1/72436 |
| 2017/0357320 A1 * | 12/2017 | Chaudhri | H04M 1/72436 |
| 2017/0371846 A1 * | 12/2017 | Mellor | G06F 16/957 |
| 2018/0143964 A1 * | 5/2018 | Orr | G06F 40/274 |
| 2018/0307393 A1 * | 10/2018 | Clark | G06F 3/0485 |
| 2019/0114064 A1 * | 4/2019 | Monibi | G06F 3/0488 |
| 2019/0132639 A1 * | 5/2019 | Panchaksharaiah | H04N 21/47217 |
| 2019/0141415 A1 * | 5/2019 | Tegethoff | G11B 27/28 |
| 2019/0191208 A1 * | 6/2019 | Coenen | H04N 21/4312 |
| 2020/0145713 A1 * | 5/2020 | Coenen | H04N 21/4312 |
| 2020/0183531 A1 * | 6/2020 | Langlotz | G06F 3/0237 |
| 2020/0213676 A1 * | 7/2020 | Naik Raikar | H04N 21/2387 |
| 2022/0075513 A1 * | 3/2022 | Walker | G06F 3/0486 |
| 2022/0075634 A1 * | 3/2022 | Singh | G06F 3/0481 |
| 2022/0076707 A1 * | 3/2022 | Walker | G06V 20/41 |
| 2022/0365655 A1 * | 11/2022 | Wu | G06T 7/70 |
| 2023/0054388 A1 | 2/2023 | Lin | |
| 2023/0418894 A1 * | 12/2023 | Liang | G06F 3/023 |
| 2024/0127857 A1 * | 4/2024 | Caba Heilbron | G06V 20/41 |
| 2024/0135973 A1 * | 4/2024 | Bai | G11B 27/031 |

OTHER PUBLICATIONS

Statistical Aid; "Probability Distributions in Statistics " 12 pages; https://www.statisticalaid.com/probability-distributions-in-statistics/ (Year: 2020).*

Knight, Jon, "Skipping Intros, End Scenes & Other Annoying in-Video YouTube Distractions on Android", YouTube Vanced, located online: https://android.gadgethacks.com/how-to/skip-intros-end-screens-other-annoying-video-youtube-distractions-android-0331437/ , May 9, 2023, 7 pages.

* cited by examiner

900

Associate Seek
Guides
902

Receive Reference
Position
904

Calculate Seek Guide
Probabilities
906

Select Seek Guide
908

Set Playback Position
910

SNAPPING TO SEEK POSITIONS IN MEDIA CONTENT USING SEEK GUIDES

BACKGROUND

As users consume media content, they may wish to fast forward or rewind. In many applications, a user is provided with a scrub bar on which a user can select a playback position by tapping at a point on the scrub bar or dragging a cursor on the scrub bar to a new position. However, when users fast forward and rewind in this manner, the users may accidentally skip to a part of the media content that is confusing or for which the users lack context. For example, a user may select a playback position that resumes the media content in the middle of a word or a sentence. Additionally, users may skip to an undesirable position due to a lack of user accuracy in selecting the new playback position. This may happen, for example, when a user is using a touch screen on a smartphone to drag the cursor on the scrub bar. The user's finger may block some of the screen or may be too large in comparison to the scrub bar to select a precise position on the scrub bar.

SUMMARY

In general terms, this disclosure is directed to snapping to seek positions in media content using seek guides. In some embodiments, and by non-limiting example, when a user seeks to a reference position in a media content item, a seek guide is selected using a probabilistic distribution based on the reference position, and the playback position is set based on the position of the seek guide.

In an aspect, a method of determining seek positions in media content items is provided. One or more seek guides are associated with a media content item. Each of the one or more seek guides includes a position. A request from a user to seek to a reference position in the media content item is received. The reference position is determined by the user selecting the reference position on a scrub bar. A seek guide is selected from the one or more seek guides using a probabilistic distribution positioned based on the reference position, and a playback position is set based on the position of the selected seek guide.

In another aspect, a system for determining seek positions in media content items is provided. The system comprises one or more processors and one or more computer-readable storage devices. The one or more computer-readable storage devices store data instructions that when executed by the one or more processors cause the system to associate one or more seek guides with a media content item, receive a request from a user to seek to a reference position in the media content item, and set a playback position. Each of the one or more seek guides includes a position. The reference position is determined by the user selecting the reference position on a scrub bar. The playback position is set based on a probabilistic distribution and the one or more seek guides. The probabilistic distribution is positioned based on the reference position.

In another aspect, a non-transitory computer-readable medium is provided. The non-transitory computer-readable medium has data instruction stored thereon that, when executed by one or more processors, cause the one or more processors to associate one or more seek guides each including a position with a media content item, receive a request from a user to seek to a reference position in the media content item, select a seek guide from the one or more seek guides, and set a playback position based on the position of the selected seek guide. The reference position is determined by the user selecting the reference position on a scrub bar. The seek guide is selected based on a probabilistic distribution positioned based on the reference position.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
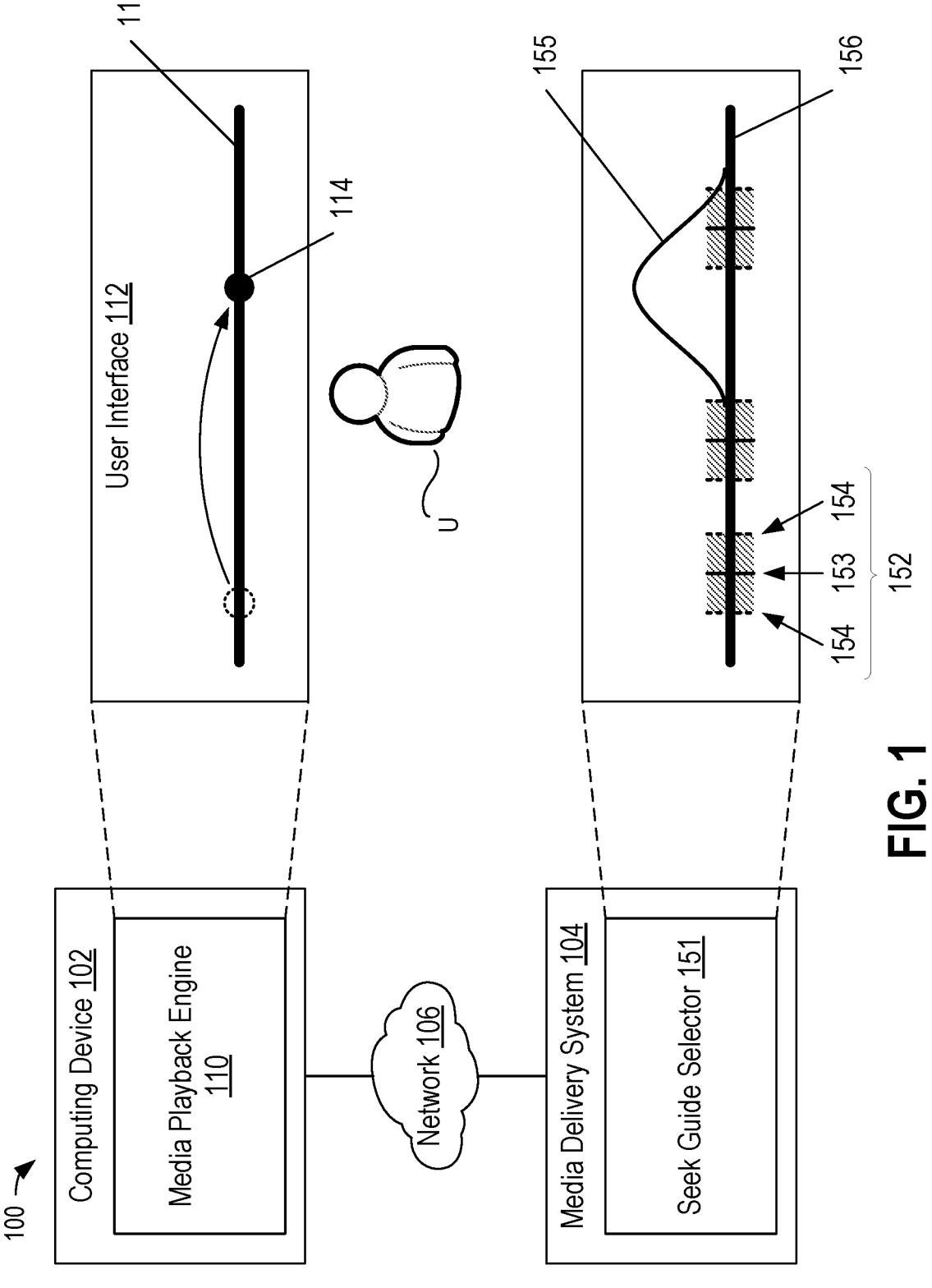
FIG. 1 illustrates a schematic block diagram of an example media playback system for setting playback positions based on seek guides.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like. The term "substantially" as used herein is a broad term and is to be given its ordinary and customary meaning to a person of ordinary skill in the art (and is not to be limited to a special or customized meaning), and furthermore refers without limitation to being largely but not necessarily wholly that which is specified.

As briefly described above, embodiments of the present disclosure are directed to snapping to seek positions in media content using seek guides. While examples described herein may refer to a specific form of media content-such as podcasts, audiobooks, or music tracks—the systems and methods described herein are applicable to any form of media content, including audio and video media content.

In example aspects, seek guides may be associated with a media content item. When a user changes a playback position by selecting a position on a scrub bar, instead of resuming playback at the position selected by the user, playback may instead resume at a position of a seek guide.

By resuming playback at the position of the seek guide rather than the position selected by the user, the user may avoid resuming playback at a position for which the user has no context or is confusing for the user. Playback may also resume at a position that is more interesting for the user. For example, seek guides may be associated with a podcast episode or an audiobook, and the seek guides may be positioned at the beginning of words and sentences. Seek guides associated with an audiobook may also be positioned at the beginning of paragraphs and chapters. In another example, seek guides may be associated with music tracks. In such examples, the seek guides may be positioned based on the lyrics, such as at the beginning of words and lines. The seek guides may also be positioned at the beginning of a verse, chorus, or hook.

Turning to FIG. 1, an example media playback system 100 for setting playback positions based on seek guides is shown. In the illustrated embodiment, the system 100 includes a user computing device 102 connected to a media delivery system 104 via a network 106.

The computing device 102 may be a media playback device. The computing device may include a media playback engine 110, which may be used to stream or otherwise play media content for a user U. The media playback engine 110 may include a user interface 112 that is presented on the computing device 102. The user interface may include a position indicator 114 on a scrub bar 116. The position indicator 114 and the scrub bar 116 may define a playback position within a media content item being played through the media playback engine 110. The scrub bar 116 may represent a timeline 156 of the media content item within the media delivery system 104, and the position indicator 114 may indicate a current playback position within the media content item.

As the media content item is played through the media playback engine 110, the user U may wish to change the playback position within the media content item—i.e., the user U may wish to fast forward or rewind within the media content item. To change the playback position, the user U may select a reference position with the scrub bar 116. In an example, the user U may tap at the reference position on the scrub bar 116 to change the playback position. In another example, the user U may drag the position indicator 114 to the reference position on the scrub bar 116.

When the user U selects the reference position, a seek guide selector 151 in the media delivery system 104 may select a seek guide 152 to be the playback position. The seek guide selector 151 may maintain the timeline 156 representative of the media content item that includes one or more seek guides 152. Each seek guide 152 may have a position 153 and a radius 154. The position 153 may be a point in time within the media content item, and the radius 154 may define a range of time around the position 153. For example, a seek guide 152 may have a position 153 of 10 seconds and a radius 154 of 2 seconds. The seek guide 152 may thus cover a range from 8 seconds to 12 seconds. Alternatively, the radius 154 may include two points in time that define a range of time around the position 153. For example, the seek guide 152 may have a position 153 of 10 seconds and a radius 154 that includes points at 8 seconds and 12 seconds to define a range from 8 to 12 seconds. In some embodiments, the points included in the radius 154 are not equidistant from the position 153—e.g., the position 153 may be at 10 seconds, and the radius 154 may include points at 8 seconds and 13 seconds to define a range from 8 seconds to 13 seconds.

Seek guides 152 may have positions 153 at points of interest within the media content item. For example, the positions 153 of seek guides 152 may be based on transcription data of the media content item—e.g., seek guides 152 may have positions 153 at the beginning of words, sentences, or paragraphs. This may be the case if the media content item associated with the seek guides is a podcast or an audiobook. The positions 153 of seek guides 152 may also be based on transcription data if the media content item is a music track; seek guides 152 may have positions 153 at the start of words in the lyrics. Additionally with music tracks, seek guides 152 may have positions 153 at the beginning of a verse, chorus, or hook. In an embodiment, the radius 154 of a seek guide 152 may also be based on transcription data, as described herein.

To select a seek guide 152, the seek guide selector 151 may create a probabilistic distribution 155 that is positioned based on the reference position selected by the user. For example, the probabilistic distribution may have a mean at the reference position. Probabilities may then be calculated for each of the seek guides 152 using a cumulative distribution function. These probabilities may represent the probability that the position 153 of the seek guide 152 is the intended playback position for the user U. The seek guide selector 151 may select a seek guide 152 based on these probabilities—e.g., the seek guide selector 151 may select the seek guide 152 with the highest probability of being the intended playback position for the user U. The seek guide selector 151 may then set the playback position based on the position 153 of the selected seek guide 152. For example, the playback position may be set at the position 153 of the selected seek guide 152. In another example, the playback position may be set before the position 153 of the selected seek guide 152—e.g., one second before the position 153 of the seek guide 152.

By resuming playback at the position 153 of the selected seek guide 152 rather than at the reference position selected by the user U, playback may resume at a point of interest rather than resuming playback at the reference position which may be in the middle of an interesting portion of the media content item.

Figure 2:
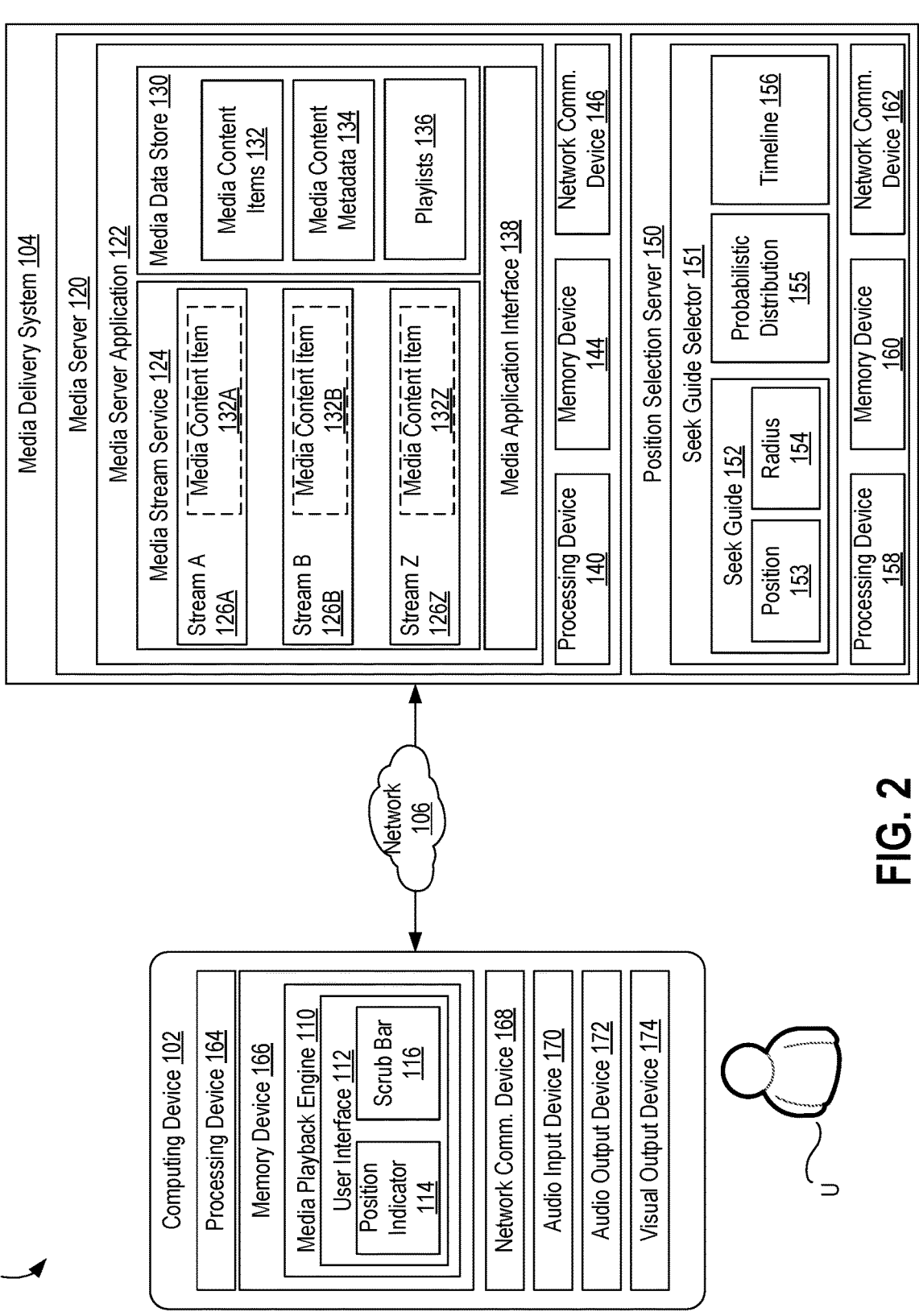
FIG. 2 illustrates a schematic block diagram of another example of a media playback system shown in FIG. 1.

FIG. 2 illustrates a schematic block diagram illustrating another example of the media playback system 100 shown in FIG. 1. In this example, the media playback system 100 includes the computing device 102 for a user U and the media delivery system 104. The network 106 is also shown for communication between the computing device 102 and the media delivery system 104.

As described herein, the computing device 102 operates to play media content items to a user U through the media playback engine 110. The computing device 102 may be, for example, a media playback device. In some embodiments, the computing device 102 operates to play media content items 132 that are provided (e.g., streamed, transmitted, etc.) by a system remote from the computing device 102 such as the media delivery system 104, another system, or a peer device. Alternatively, in some embodiments, the computing device 102 operates to play media content items stored locally on the computing device 102. Further, in at least some embodiments, the computing device 102 operates to play media content items that are stored locally as well as media content items provided by remote systems.

In some embodiments, the computing device 102 includes a processing device 164, a memory device 166, a network communication device 168, an audio input device 170, an audio output device 172, and a visual output device 174. In the illustrated example, the memory device 166 includes the media playback engine 110 which may display a user interface 112 to the user U with a position indicator 114 and a scrub bar 116. Other embodiments of the computing device 102 include additional, fewer, or different components. Examples of computing devices include a smartphone, a smart speaker, and a computer (e.g., desktop, laptop, tablet, etc.).

In some embodiments, the processing device 164 comprises one or more processing devices, such as central processing units (CPU). In other embodiments, the processing device 164 additionally or alternatively includes one or more digital signal processors, field-programmable gate arrays, or other electronic circuits. In some embodiments, the processing device 164 includes at least one processing device that can execute program instructions to cause the at least one processing device to perform one or more functions, methods, or steps as described herein.

The memory device 166 operates to store data and program instructions. In some embodiments, the memory device 166 stores program instructions for the media playback engine 110 that enables playback of media content items received from the media delivery system 104. As described herein, the media playback engine 110 is configured to communicate with the media delivery system 104 to receive one or more media content items—e.g., through the media content streams 126 (including media content streams 126A, 126B, and 126Z).

The memory device 166 includes at least one memory device. The memory device 166 typically includes at least some form of computer-readable media. Computer-readable media include any available media that can be accessed by the computing device 102. By way of example, computer-readable media can include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read-only memory, electrically erasable programmable read-only memory, flash memory and other memory technology, compact disc read-only memory, blue ray discs, digital versatile discs or other optical storage, magnetic cassettes, magnetic tape, magnetic disk storage or other magnetic storage devices, or any other medium that can be accessed by the computing device 102. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The network communication device 168 is a device that operates to communicate data across the network 106. The network communication device 168 allows the computing device 102 to communicate with remote devices, such as with the media server 120 and the position selection server 150 of the media delivery system 104. Examples of the network communication device 168 include wired and wireless data communication devices, such as a cellular, WIFI, BLUETOOTH™, LoRa, and wired (e.g., Ethernet) communication device.

Some embodiments include an audio input device 170 that operates to receive audio input, such as voice input provided by the user. The audio input device 170 typically includes at least one microphone. In some embodiments, the audio input device 170 detects audio signals directly, and in other embodiments, the audio input device 170 communicates with another device that detects the audio signals (such as through a Bluetooth-connected microphone).

The audio output device 172 operates to output audible sounds, such as the media content and other audio outputs, such as audio cues. In some embodiments, the audio output device 172 generates media output to play media content to the user U. Examples of the audio output device 172 include a speaker, an audio output jack, and a Bluetooth transceiver (such as for communication with a Bluetooth-connected speaker). In some embodiments, the audio output device 172 generates an audio output directly, and in other embodiments, the audio output device 172 communicates with another device that generates the audio output. For example, the audio output device 172 may transmit a signal through an audio output jack or a Bluetooth transmitter that can be used to generate the audio signal by a connected or paired device such as headphones or a speaker.

Some embodiments also include a visual output device 174. The visual output device 174 includes one or more light-emitting devices that generate a visual output. Examples of the visual output device 174 include a display device (which can include a touch-sensitive display device) and lights such as one-or-more light-emitting diodes (LEDs). The visual output device 174 may operate to display the user interface 112 to the user U.

Still with reference to FIG. 2, the media delivery system 104 includes one or more computing devices, such as the media server 120 that provides media content items 132 to the computing device 102, and the position selection server 150 that selects seek guides 152 to which seek positions may be snapped. Each of the media server 120 and the position selection server 150 can include multiple computing devices in some embodiments. Although shown as separate servers, the media server 120 and the position selection server 150 may be the same server.

In some embodiments, the media delivery system 104 operates to transmit media content items 132 to one or more media playback devices such as the computing device 102.

In this example, the media server 120 comprises a media server application 122, a processing device 140, a memory device 144, and a network communication device 146. The processing device 140, memory device 144, and network communication device 146 may be similar to the processing device 164, memory device 166, and network communication device 168 respectively, which have been previously described.

In some embodiments, the media server application 122 operates to stream music or other audio, video, or other forms of media content. The media server application 122 includes a media stream service 124, a media data store 130, and a media application interface 138.

The media stream service 124 operates to buffer media content such as media content items 132 (including 132A, 132B, and 132Z) for streaming to one or more streams 126 (including 126A, 126B, and 126Z).

The media application interface 138 can receive requests or other communication from the media playback devices (such as the computing device 102) or other systems, to retrieve media content items from the media delivery system 104. For example, in FIG. 2, the media application interface 138 receives communications from the media playback engine 110 of the computing device 102.

In some embodiments, the media data store 130 stores media content items 132, media content metadata 134, and playlists 136. In some embodiments, the media data store 130 may also store information about seek guides 152. The media data store 130 may comprise one or more databases and file systems. Other embodiments are possible as well. As noted above, the media content items 132 may be audio, video, or any other type of media content, or a combination of any type of media content items, which may be stored in any format for storing media content. For example, media content items 132 may be music tracks, audiobooks, podcasts, advertisements, or any other form of media content.

The media content metadata 134 operates to provide information associated with the media content items 132. In some embodiments, the media content metadata 134 includes one or more of title, artist, lyrics, album name, length, genre, mood, era, captions, or other media metadata.

Information about seek guides 152 may be stored with other media content metadata 134. The information about seek guides 152 may be associated with a media content item 132. Seek guides 152 may be stored as a list. As described herein, seek guides 152 may be assigned to layers. In such embodiments, each layer of seek guides 152 may be stored as a list of positions 153. Because each seek guide 152 in a layer may have the same radius 154, a single value may be stored with the list of positions 153 to represent the radii 154 for each seek guide 152 in that layer.

The playlists 136 operate to identify one or more of the media content items 132. In some embodiments, the playlists 136 identify a group of the media content items 132 in a particular order. In other embodiments, the playlists 136 merely identify a group of the media content items 132 without specifying a particular order. Some, but not necessarily all, of the media content items 132 included in a particular one of the playlist 136 are associated with a common characteristic such as a common genre, mood, or era.

In this example, the position selection server 150 includes a seek guide selector 151 with seek guides 152, a probabilistic distribution 155, a timeline 156, a processing device 158, a memory device 160, and a network communication device 162. Each seek guide 152 may have a position 153 and a radius 154. In some embodiments, the position selection server 150 maintains information about the seek guides 152. Alternatively, as described above, information about the seek guides 152 may be stored in the media data store 130. Information about the seek guides 152 may be associated with a media content item 132.

In some embodiments, any one or more of the functions, methods, and operations described herein as being performed by the position selection server 150—or components of the position selection server 150, such as the seek guide selector 151—can alternatively be performed by the media playback engine 110. This may include embodiments where the media delivery system 104 does not include a position selection server 150 and embodiments where the position selection server 150 cooperates with the media playback engine 110 and the functions are split between those components.

Components of the position selection server 150 can operate on a single computing device, or by cooperation of multiple computing devices. For example, the seek guide selector 151 can operate solely on the computing device 102 or solely on the position selection server 150. Alternatively, portions of components of the position selection server 150 can be performed by one or more other computing devices, such as by data communication between the computing device 102 and the media delivery system 104.

The processing device 158, memory device 160, and network communication device 162 may be similar to the processing device 164, memory device 166, and network communication device 168 respectively, which have each been previously described.

In various embodiments, the network 106 includes one or more data communication links, which may include multiple different types. For example, the network 106, can include wired and/or wireless links, including BLUETOOTH™, ultra-wideband (UWB), 802.11, ZigBee, cellular, LoRa, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Figures 3, 4:
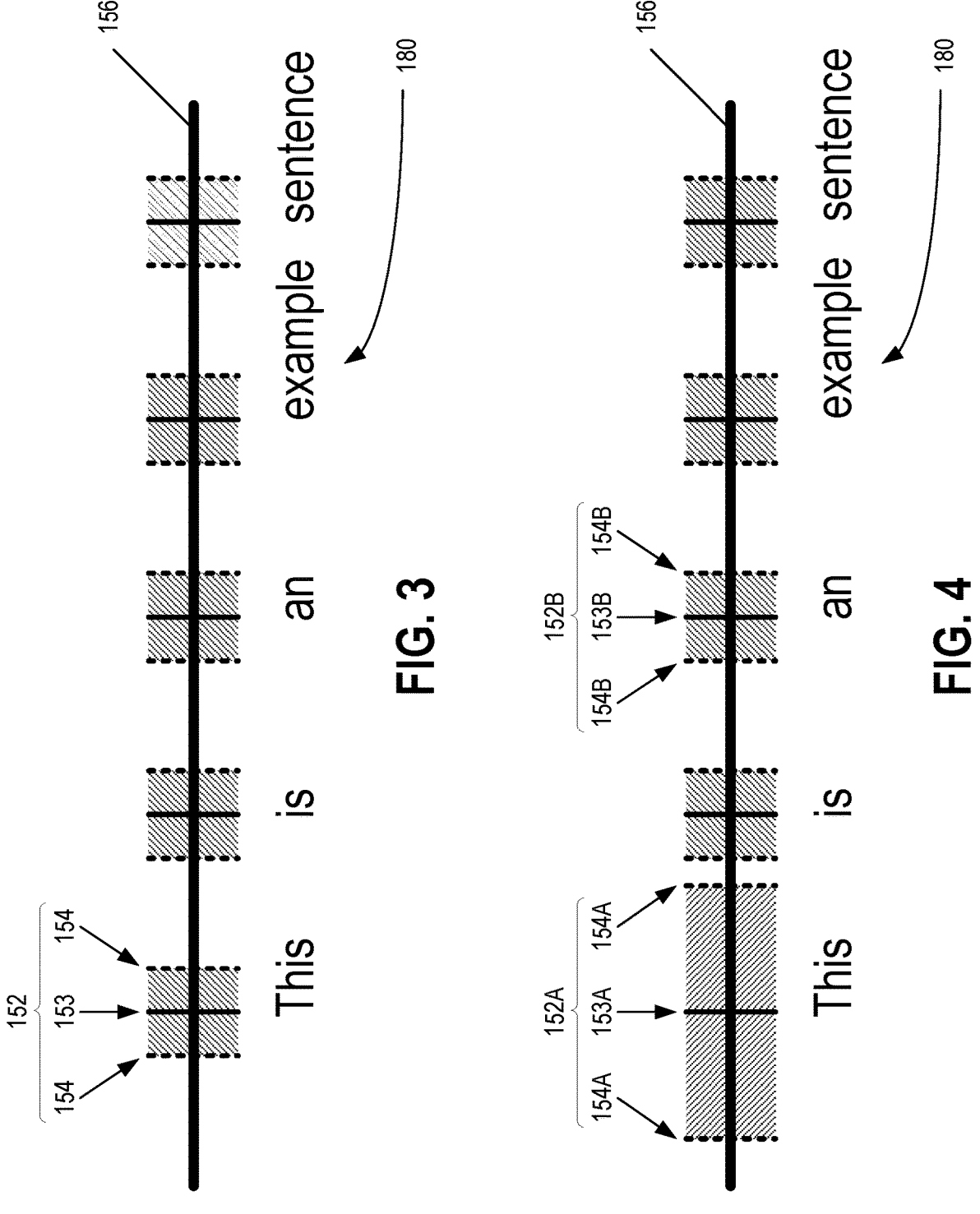
FIG. 3 illustrates an example of seek guides associated with a media content item.
FIG. 4 illustrates a second example of seek guides associated with a media content item.

FIGS. 3 and 4 illustrate examples of seek guides 152 on a timeline 156 of a media content item. In the illustrated examples, seek guides 152 are positioned on the timeline 156 based on media content metadata (such as the media content metadata 134 maintained by the media delivery system 104 shown in FIG. 2), which in the illustrated examples is transcription data 180 for the media content item. The transcription data 180 may be, for example, a transcript of a podcast or an audiobook or lyrics of a music track. Each seek guide 152 has a position 153. In the illustrated embodiment, each position 153 is at the beginning of a word or sentence in the transcription data 180.

Each seek guide also has a radius 154. As described herein, the radius 154 may act as a weight for the seek guides 152, with a seek guide 152 with a larger radius 154 being more likely to be selected to be the playback position. As is shown in FIG. 3, the radius 154 of each seek guide 152 is the same. Because each seek guide 152 in FIG. 3 has the same radius 154, each seek guide 152 may be as likely to be selected when selecting a playback position. In contrast, in FIG. 4, a first seek guide 152A has a larger radius 154A than a second seek guide 152B. Because the first seek guide 152A has a larger radius 154A than the second seek guide 152B, the first seek guide 152A may be more likely to be selected when selecting a playback position than the second seek guide 152B.

The radius 154 may be based on a layer to which the seek guide 152 was assigned, with different layers having a different value for the radius 154. For example, if the seek guides 152 are positioned at the beginning of words and sentences, the seek guides 152 may be assigned between two layers: a first layer for seek guides 152 with a position 153 at the beginning of a sentence and a second layer for seek guides 152 with a position 153 at the beginning of a word. In the example illustrated in FIG. 4, the first seek guide 152A may be assigned to the first layer because it has a position 153A at the beginning of a sentence in the transcription data 180. The second seek guide 152B may be assigned to the second layer because it has a position 153B at the beginning of a word that is not the beginning of the sentence.

In an embodiment, the seek guides 152 may be manually associated with the media content item, such as by an administrator of a media delivery system manually setting the positions 153 and radii 154. In an alternative embodiment, the seek guides 152 may automatically be associated with the media content item, such as by automatically setting the positions 153 and radii 154 using the transcription data 180. For example, if the transcription data 180 includes a transcript or lyrics for the media content item and data mapping the transcript or lyrics to times in the media content item—e.g., forced alignment data—positions 153 may automatically be set at the beginning of words and sentences, and radii 154 may automatically be set to different values based on whether the seek guide 152 is positioned at the beginning of a word or a sentence. Automatically setting the radii 154 may include assigning the seek guides 152 to layers based on the transcription data 180—e.g., assigning seek guides 152 at the beginning of a sentence to a first layer and seek guides at the beginning of a word to a second layer—and then setting the radii 154 based on a layer to which the seek guide 152 is assigned. Alternatively, the radii 154 may automatically be set to a uniform value for all seek guides 152.

FIGS. 5-8 illustrate examples of setting a playback position using seek guides. A user may wish to change a playback position in a media content item. To change the playback position, the user may use a user interface 112 to select a reference position 204 in a scrub bar 116 that represents a timeline of the media content item. This may be done, for example, by the user dragging a position indicator 114 from an initial playback position 202 to the reference position 204. In another example, the user may change the playback position by tapping or clicking on the scrub bar 116 at the reference position 204, which may move the position indicator 114 from the initial playback position 202 to the reference position 204.

After the user sets the reference position 204, a seek guide selector 151 may select a seek guide 152 to use in setting a new playback position 206. As described above, the seek guides 152 have a position 153 and a radius 154 and are positioned on a timeline 156 of the media content item. The seek guide selector 151 may select a seek guide using a probabilistic distribution 155. The probabilistic distribution 155 may represent the probability that a position is the position the user intended to set as the new playback position 206.

The probabilistic distribution 155 may be positioned based on the reference position 204 set by the user. In the illustrated embodiments of FIGS. 5, 6 and 8, the probabilistic distribution 155 may be a normal distribution. In alternative embodiments, other types of probabilistic distributions may be used. For example, such as in the embodiment depicted in FIG. 7, the probabilistic distribution 155 may be a skewed distribution. Other types of probabilistic distributions may be used as well, including exponential distributions and bimodal distributions. As in the illustrated embodiments, the probabilistic distribution 155 may have a mean at the reference position 204. In alternative embodiments, the probabilistic distribution 155 may be positioned based on the reference position 204 in alternative manners. For example, the probabilistic distribution 155 may be positioned such that the probabilistic distribution 155 has a median or a mode at the reference position 204.

A standard deviation of the probabilistic distribution 155 may be based on a type of computing device on which the user interface 112 is presented to the user. The standard deviation of the probabilistic distribution may be based on a size of a screen of the computing device and/or a type of input device used by the computing device. For example, if the computing device is a smartphone, the probabilistic distribution 155 may have a large standard deviation because the user may have difficulty accurately selecting the reference position 204 on a smartphone that may use a touchscreen input that is a few inches big. In another example, if the computing device is a personal computer, the standard deviation of the probabilistic distribution may be small because the user may be able to accurately select the reference position 204 on a large monitor using a computer mouse as an input device. The standard deviation may account for inaccuracy in the user selecting the reference position, with users being more inaccurate on small screens using a touch input than on large screens using a computer mouse for input.

The probabilistic distribution 155 may be used to calculate a probability for each seek guide 152. The probabilities calculated for each seek guide 152 may represent the probability that the position 153 of the seek guide 152 is the playback position intended by the user. The probabilities may be calculated using a cumulative distribution function of the probabilistic distribution 155. The cumulative distribution function may define the probability for a seek guide 152 that the intended playback position is within one radius 154 of the position 153. In an example, the probabilities are calculated using the following equation, where $p_p$ represents the probability, $F_x$ represents the cumulative distribution function, $\rho$ represents the position 153 of the seek guide 152, and r represents the radius 154 of the seek guide 152:

$$1)\ p_\rho = F_X(\rho + r) - F_x(\rho - r)$$

In alternative embodiments, a probability may be calculated for only a subset of the seek guides 152. For example, the seek guide selector 151 may only calculate probabilities for a predetermined number of seek guides 152 based on a distance from the reference position 204 to the positions 153 of the seek guides 152—e.g., probabilities may be calculated for seek guides 152 that have positions 153 among the 10 closest positions 153 to the reference position 204. In another example, the seek guide selector 151 may calculate probabilities only for seek guides 152 that have positions 153 within a predetermined distance of the reference position—e.g., the seek guide selector 151 may only calculate probabilities for seek guides 152 that have positions 153 within 5 seconds of the reference position 204. In a further example, the seek guide selector 151 may only calculate probabilities for one seek guide 152 in each layer—e.g., the seek guide selector 151 may calculate probabilities for the seek guides 152 that have positions 153 that are the closest to the reference position 204 in each layer. In another example, the seek guide selector 151 may calculate probabilities only for seek guides 152 that have positions 153 that are the same direction from the initial playback position 202 as the reference position 204. This may prevent the new playback position 206 from being set behind the initial playback position 202 when the user is attempting to fast forward, and similarly may prevent the new playback position 206 from being ahead of the initial playback position 202 when the user is attempting to rewind.

In the illustrated embodiments of FIGS. 5-8, the calculated probabilities for each seek guide 152 are represented by shaded regions between the probabilistic distribution 155 and the timeline 156. A larger shaded area indicates a higher probability that the position 153 of the seek guide 152 associated with the shaded area is the intended playback position.

The seek guide selector 151 may select the seek guide 152 for setting the new playback position 206 based on the calculated probabilities. For example, the seek guide selector 151 may select the seek guide 152 that had the highest calculated probability. If the calculated probabilities for multiple seek guides 152 are the same, the seek guide selector 151 may use tiebreakers to select a seek guide from among the seek guides 152 with the highest calculated probabilities. For example, the seek guide selector 151 may select the seek guide 152 with a position 153 that is closest to the reference position 204 as the tiebreaker. In an alternative example, the seek guide selector 151 may select the seek guide 152 that has the largest radius 154 as the tiebreaker. In another alternative example, the seek guide selector 151 may select the seek guide 152 with a position 153 that is earliest on the timeline 156 as the tiebreaker. In another alternative example, the seek guide selector 153 may randomly select a seek guide 152 as the tiebreaker.

In some embodiments, the seek guide selector 151 may consider the direction from the initial playback position 202 to the reference position 204 when selecting a seek guide 152. For example, the seek guide selector 151 may only select a seek guide 152 that has a position 153 that is the same direction from the initial playback position 202 as the reference position 204. This may prevent the new playback position 206 from being set behind the initial playback position 202 when the user is attempting to fast forward, and similarly may prevent the new playback position 206 from being ahead of the initial playback position 202 when the user is attempting to rewind.

Figure 5:
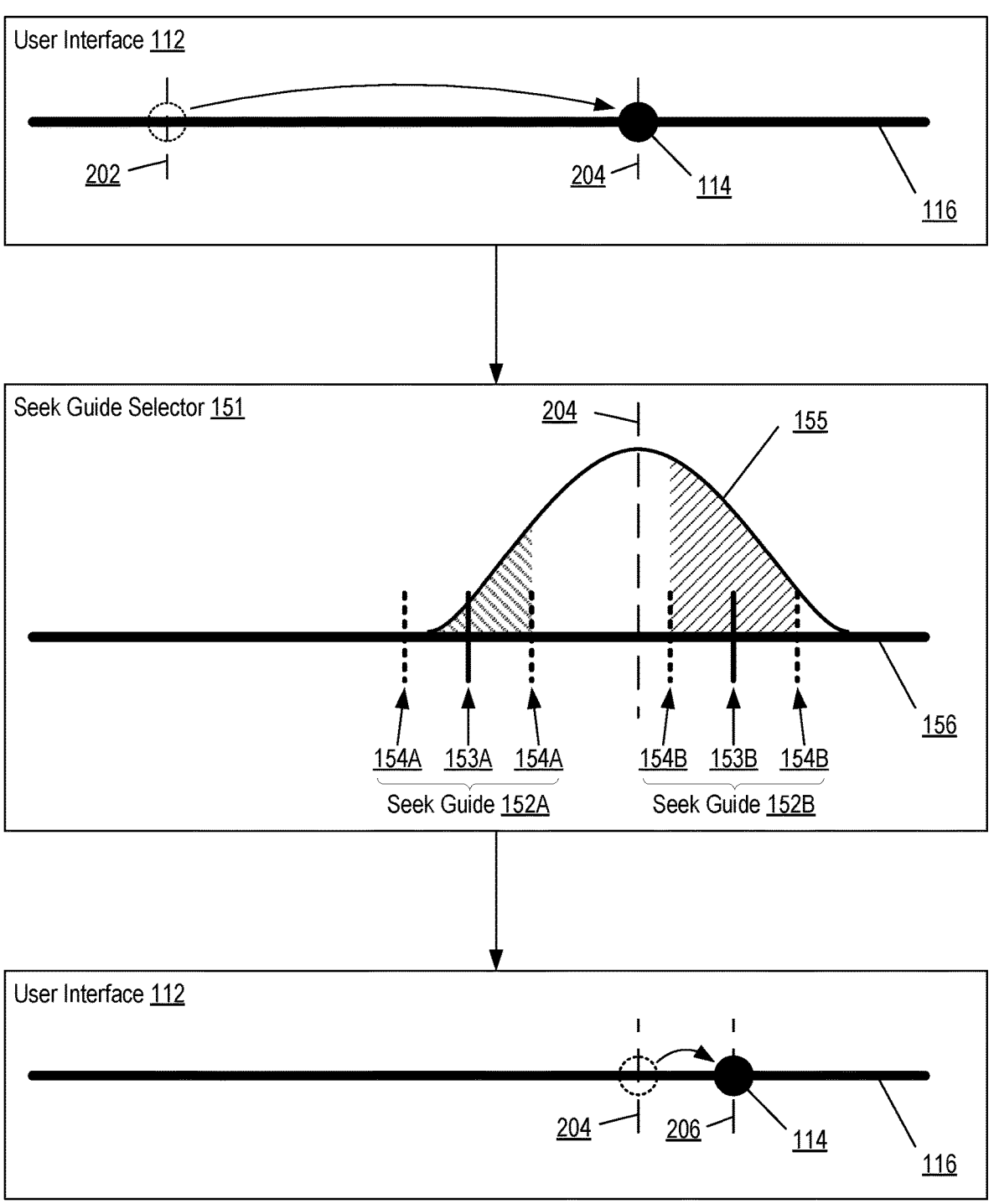
FIG. 5 illustrates an example of a playback position being set using seek guides.

In the embodiment depicted in FIG. 5, the seek guide selector 151 may choose between a first seek guide 152A and a second seek guide 152B. In the illustrated example, the seek guide selector 151 may select the second seek guide 152B. As indicated by the shaded areas between the probabilistic distribution 155 and the timeline 156, the second seek guide 152B has a higher calculated probability than the first seek guide 152A. While the second seek guide 152B has a position 153B that is closer to the reference position 204 than the first seek guide 152A, the seek guide selector 151 selects a seek guide 152 based on the calculated probabilities, not distances from the positions 153 to the reference position 204—unless distance from the positions 153 to the reference position 204 is being used as a tiebreaker, as described above.

Figure 6:
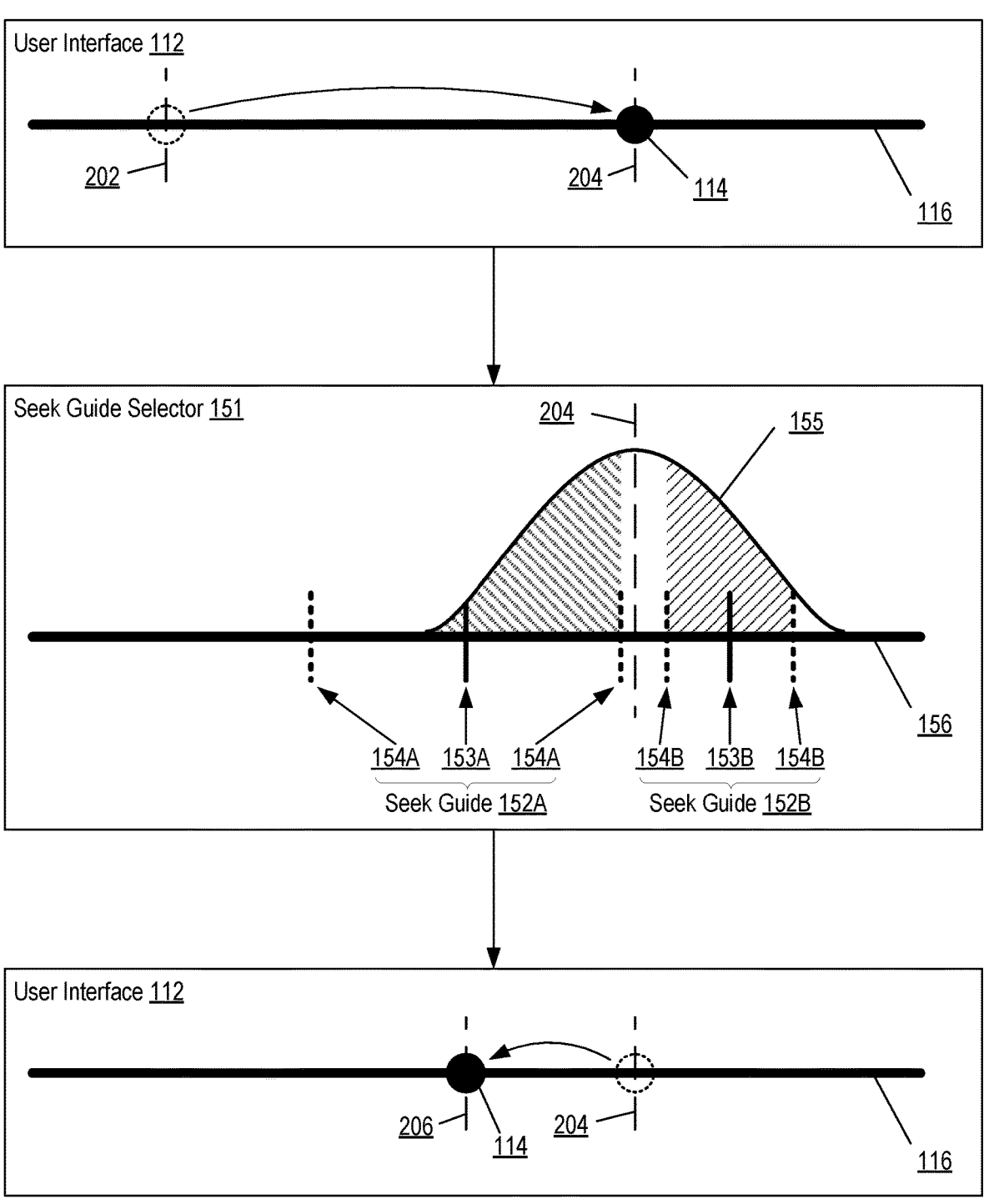
FIG. 6 illustrates a second example of a playback position being set using seek guides.
Figure 7:
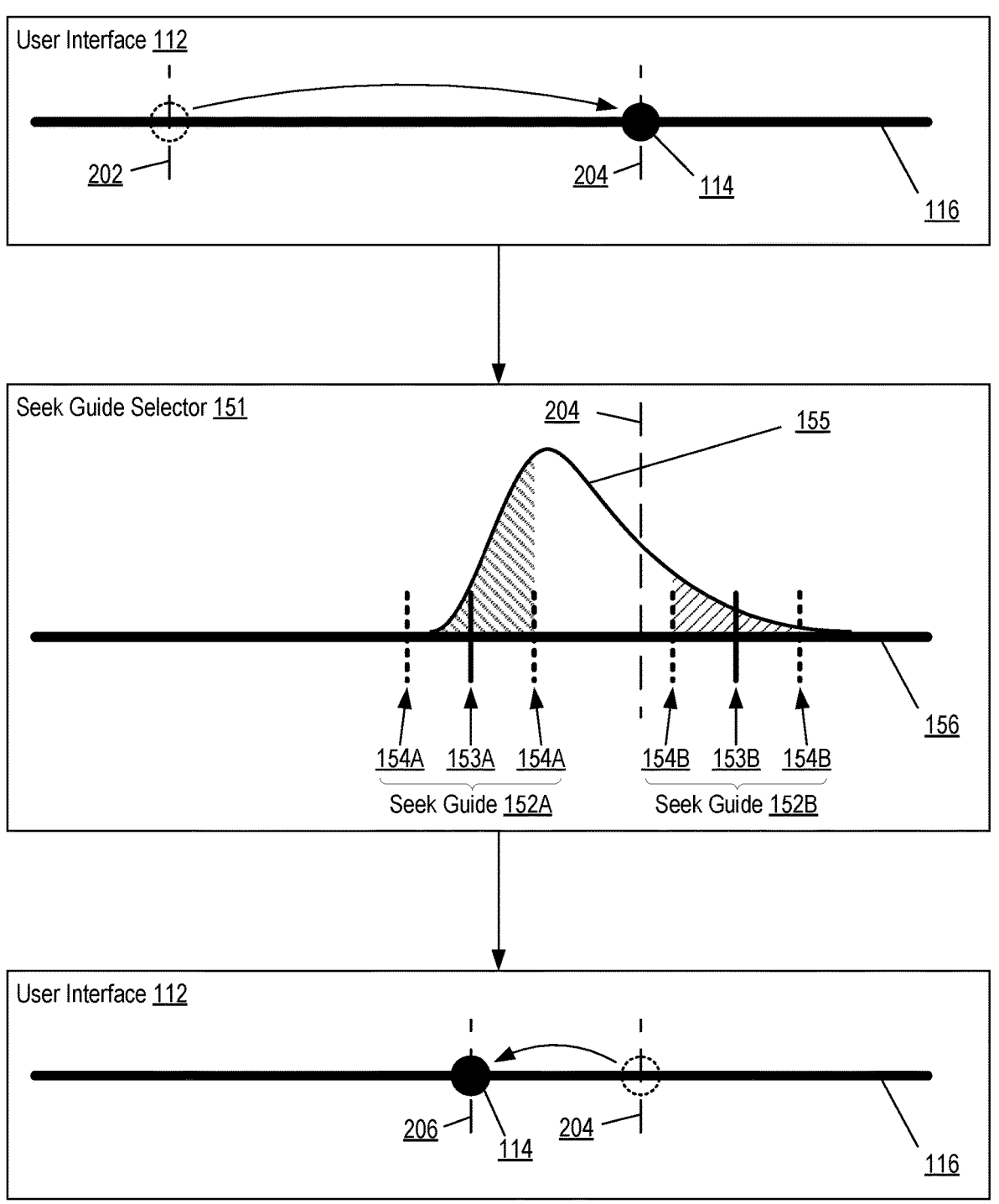
FIG. 7 illustrates a third example of a playback position being set using seek guides.

FIGS. 6 and 7 illustrate examples in which the seek guide selector 151 may select the first seek guide 152A that has a position 153A that is not the closest to the reference position 204. In the example depicted in FIG. 6, the radius 154A of the first seek guide 152A may be larger than the radius 154B of the second seek guide 152B. This may be because the first seek guide 152A is assigned to a different layer than the second seek guide 152B. For example, the first seek guide 152A may have a position 153A at the beginning of a sentence whereas the second seek guide 153B may have a position 153B at the beginning of a word, and layers may be assigned accordingly. Because the first seek guide 152A has a large radius 154A, the calculated probability using the cumulative distribution function of the probabilistic distribution 155 is higher than if the radius 154A was small-such as with the first seek guide 152A as depicted in FIG. 5. As described previously, the calculated probabilities for the seek guides 152 are indicated in the illustrated embodiments by the shaded regions between the probabilistic distribution 155 and the timeline 156. Even though the first seek guide 152A has a position 153A that is farther away from the reference position 204 than the position 153B of the second seek guide 152B, the first seek guide 152A may still be selected by the seek guide selector 151 because the first seek guide 152A has a higher calculated probability of being the intended playback position.

In the example depicted in FIG. 7, the probabilistic distribution 155 is a skewed distribution. In the illustrated embodiment, the probabilistic distribution 155 is right-skewed, but the probabilistic distribution 155 is still positioned to have a mean at the reference position 204. Thus, the probabilistic distribution has a mode to the left side of the reference position 204. A right-skewed probabilistic distribution 155 may be used to increase the likelihood that a seek guide 152 with a position 153 to the left of the reference position 204 is selected by the seek guide selector 151. This may be beneficial to increase user context when listening to and/or watching the media content item. By increasing the likelihood that a seek guide 152 with a position 153 to the left of the reference position 204 is selected by the seek guide selector 151, the new playback position 206 is more likely to be set earlier in the media content item, allowing the user to hear/see more of the media content item.

With the skewed probabilistic distribution 155, the calculated probability for the first seek guide 152A may be higher than the calculated probability for the second seek guide 152B, even though the second seek guide 152B has a position 153B closer to the reference position 204 than the position 153A of the first seek guide 152A. Accordingly, the seek guide selector 151 may select the first seek guide 152A to use in setting the new playback position 206.

By selecting based on the calculated probabilities rather than distances to the reference position 204, the seek guide selector 151 may select more optimal seek guides 152 to use for setting the new playback position 206 than if only distance to the reference position 204 were considered. For example, like in FIG. 6, the second seek guide 152B with a position 153B closest to the reference position 204 may be at the beginning of the second word of a sentence, and the first seek guide 152A that has a position 153A further away from the reference position 204 may be at the beginning of the sentence. By using the probabilistic distribution 155 to select the seek guide 152, the more optimal seek guide 152A may be selected, and the user may hear the entire sentence, rather than only hearing from the second word onward.

Once the seek guide selector 151 selects a seek guide 152, the seek guide selector 151 may set the new playback position 206 based on the position 153 of the selected seek guide 152. For example, the new playback position 206 may be set substantially at the position 153 of the selected seek guide 152. In another example, the new playback position 206 may be set before the position 153 of the selected seek guide 152—e.g., one second before the position 153. In an embodiment, the seek guide selector 151 works with another component, such as the media stream service 124 or the media playback engine 110 shown in FIG. 2 to set the new playback position 206.

The user interface 112 may be updated based on the new playback position 206 set by the seek guide selector 151. The position indicator 114 may move along the scrub bar 116 from the reference position 204 to the new playback position 206, which may match the position 153 of the selected seek guide 152. Playback of the media content item may then continue from the new playback position 206.

Although the position indicator 114 is shown as moving first from the initial playback position 202 to the reference position 204 and then to the new playback position 206 in the illustrated embodiments of FIGS. 5-7, in alternative embodiments, the position indicator 114 may move directly from the initial playback position 202 to the new playback position 206 without moving to the reference position 204. For example, if the user selects the reference position 204 by tapping at the reference position 204 on the scrub bar 116 in the user interface 112, the position indicator 114 may stay at the initial playback position 202 until the seek guide selector 151 selects a seek guide 152 and determines a new playback position 206.

Figure 8:
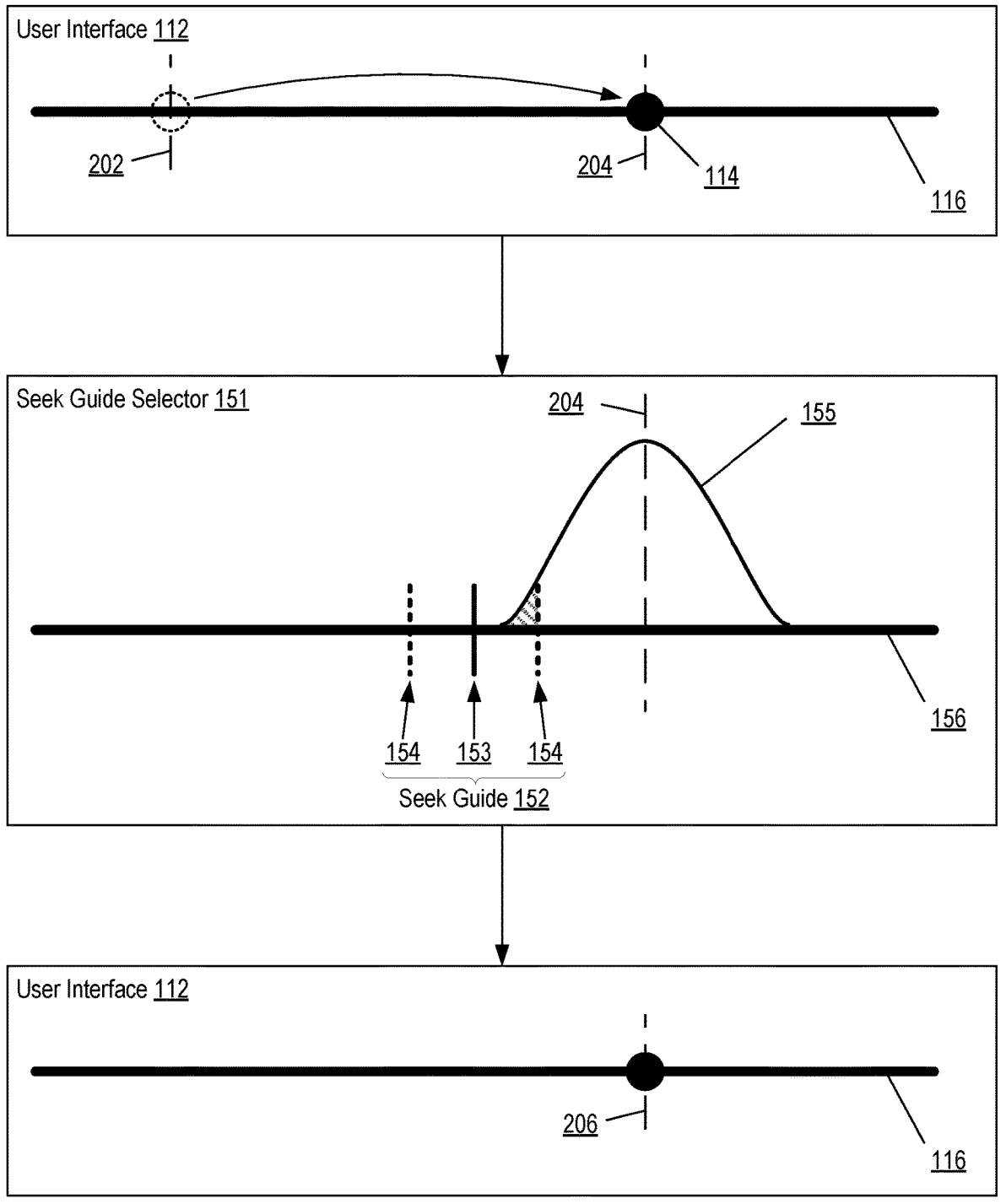
FIG. 8 illustrates a fourth example of a playback position being set using seek guides.

In alternative embodiments, such as the embodiment depicted in FIG. 8, the seek guide selector 151 may not select a seek guide 152 to use for setting the new playback position 206. The seek guide selector 151 may use a predetermined threshold when selecting a seek guide 152; a seek guide 152 may not be selected if the calculated probability is below the predetermined threshold.

In the embodiment, depicted in FIG. 8, the probabilistic distribution 155 may have a smaller standard deviation than in the previously illustrated embodiments of FIGS. 5-7. The seek guide 152 may thus have a smaller calculated probability when determining the calculated probability using the cumulative distribution function of the probabilistic distribution 155. The calculated probability may be lower than the predetermined threshold, so the seek guide selector 151 may not select the seek guide 152. For example, the predetermined threshold may be 0.2 and the seek guide 152 may have a calculated probability of 0.1. Because the seek guide selector 151 may not select a seek guide 152 to set the playback position, the seek guide selector 151 may set the playback position at the reference position 204. If the new playback position 206 is the same as the reference position 204, the position indicator 114 may already be in the new playback position 206 from the user moving the position indicator 114 along the scrub bar 116 to set the reference position 204.

While the illustrated embodiments of FIGS. 5-8 show user fast-forwarding in the media content item by selecting a reference position 204 to the right of the initial playback position 202, the seek guide selector 151 works in a similar manner when the user rewinds by selecting a reference position 204 to the left of the initial playback position 202.

Figure 9:
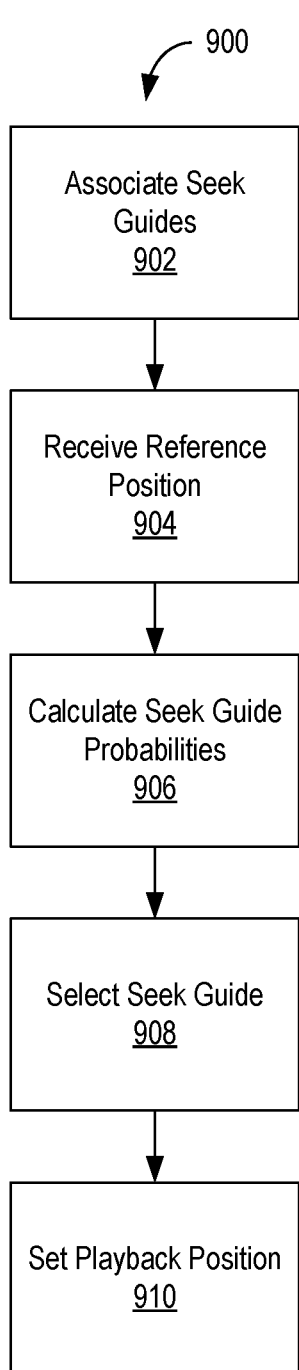
FIG. 9 illustrates a flowchart of an example method for setting a playback position using seek guides.

Turning to FIG. 9, an example flowchart of a method 900 for snapping to seek positions in media content using seek guides is shown. The method 900 includes operations 902, 904, 906, 908, 910.

The operation 902 is performed to associate one or more seek guides with a media content item. As described above, each seek guide has a position and a radius. The positions of the seek guides may be at points of interest within the media content item. For example, seek guides may have positions at the beginning of words and sentences in a podcast or audiobook. In another example, seek guides may have positions at the beginning of verses in a media track. The radii may be based off the positions of the seek guides. For example, a seek guide with a position at the beginning of a sentence may have a larger radius than a seek guide with a position at the beginning of a word.

The positions and radii may be set manually, such as by an administrator of a media delivery system. Alternatively, the positions and radii may be set automatically. In an example, transcription data for the media content item may be used to automatically set the positions and radii of the seek guides. The transcription data may include a transcript or lyrics for the media content item and data mapping the transcript or lyrics to times in the media content item, such as forced alignment data. Using the transcription data, the positions and radii can automatically be set at the beginning of words and sentences. Rather than directly setting the radii for each seek guide, seek guides may instead be assigned to layers, and each layer may be assigned a radius so that each seek guide in a layer has the same radius. Seek guides may be assigned to layers manually or automatically, such as by using the transcription data.

The operation 902 may be performed by a seek guide selector. The seek guide selector may set positions and radii for seek guides using transcription data for a media content item. The transcription data may come from media content metadata stored in a media data store in a media delivery system. The seek guide selector may maintain a list of the seek guides for a media content item. Alternatively, the seek guide selector may store the list of seek guides in the media data store, and the list of seek guides may be stored with other media content metadata.

The operation 904 is performed to receive a reference position. The reference position may be set by a user seeking—i.e., fast forwarding or rewinding—in a media content item. The reference position may be a position to which the user is requesting to seek.

The operation 904 may be performed by a seek guide selector receiving the reference position from a user computing device. The computing device may execute a media playback engine and may display a user interface with a scrub bar. A user may select a reference position by interacting with the scrub bar. For example, the user may move a position indicator from an initial playback position to the reference position. In another example, the user may tap or click on the scrub bar at the reference position. After the user selects the reference position, the reference position may be transmitted from the computing device to the seek guide selector.

The operation 906 is performed to calculate probabilities for at least one of the one or more seek guides associated with the media content item. The calculated probabilities may represent the probability that the position of the seek guide is the intended playback position to which the user wanted to seek. As described above, the probabilities may be calculated using a cumulative distribution function of a probabilistic distribution. The probabilistic distribution may be positioned based on the reference position received during the operation 904, such as by having a mean at the reference position. The probabilistic distribution may also be based on a type of computing device used by the user. For example, a standard deviation of the probabilistic distribution may be based, at least in part, on the type of user device. If the user device is a smartphone that uses a small screen for touchscreen input, the standard deviation may be larger than if the user device is a personal computer that has a large screen and uses a computer mouse for input. The standard deviation may account for inaccuracy in the user selecting the reference position, with users being more inaccurate on small screens using a touch input than on large screens using a computer mouse for input.

The operation 906 may be performed by a seek guide selector using a probabilistic distribution that is a normal distribution with a mean at the reference position. In other examples, the seek guide selector may use other types of probabilistic distributions, such as skewed distributions, exponential distributions, and bimodal distributions. In further examples, the probabilistic distribution may be positioned differently, such as having a median or a mode at the reference position.

The operation 908 is performed to select a seek guide. The seek guide may be selected based on the probabilities calculated during the operation 906. For example, the seek guide with the highest probability may be selected. If multiple seek guides are tied for the highest probability, tiebreakers may be used to select the seek guide. Examples of tiebreakers include selecting the seek guide with a position closest to the reference position, selecting the seek guide with the largest radius, selecting the seek guide with a position earliest in the media content item, and randomly selecting a seek guide.

The operation 908 may be performed by a seek guide selector. The seek guide selector may rank the seek guides based on the calculated probabilities and select the seek guide with the highest probability.

The operation 910 is performed to set a new playback position. The new playback position may be based on the position of the seek guide selected during the operation 908, such as at the position of the seek guide.

The operation 910 may be performed by a seek guide selector. The seek guide selector may cooperate with a media stream service and/or a media playback engine to set the new playback position. For example, the seek guide selector may send the position of the selected seek guide to the media stream service and/or media playback engine, and the media stream service and/or media playback engine may then set the new playback position and continue playback of the media content item from the new playback position. A user interface of a computing device executing the media playback engine may also be updated with the new playback position. A position indicator may be moved along a scrub bar to a position representing the new playback position.

Figure 10:
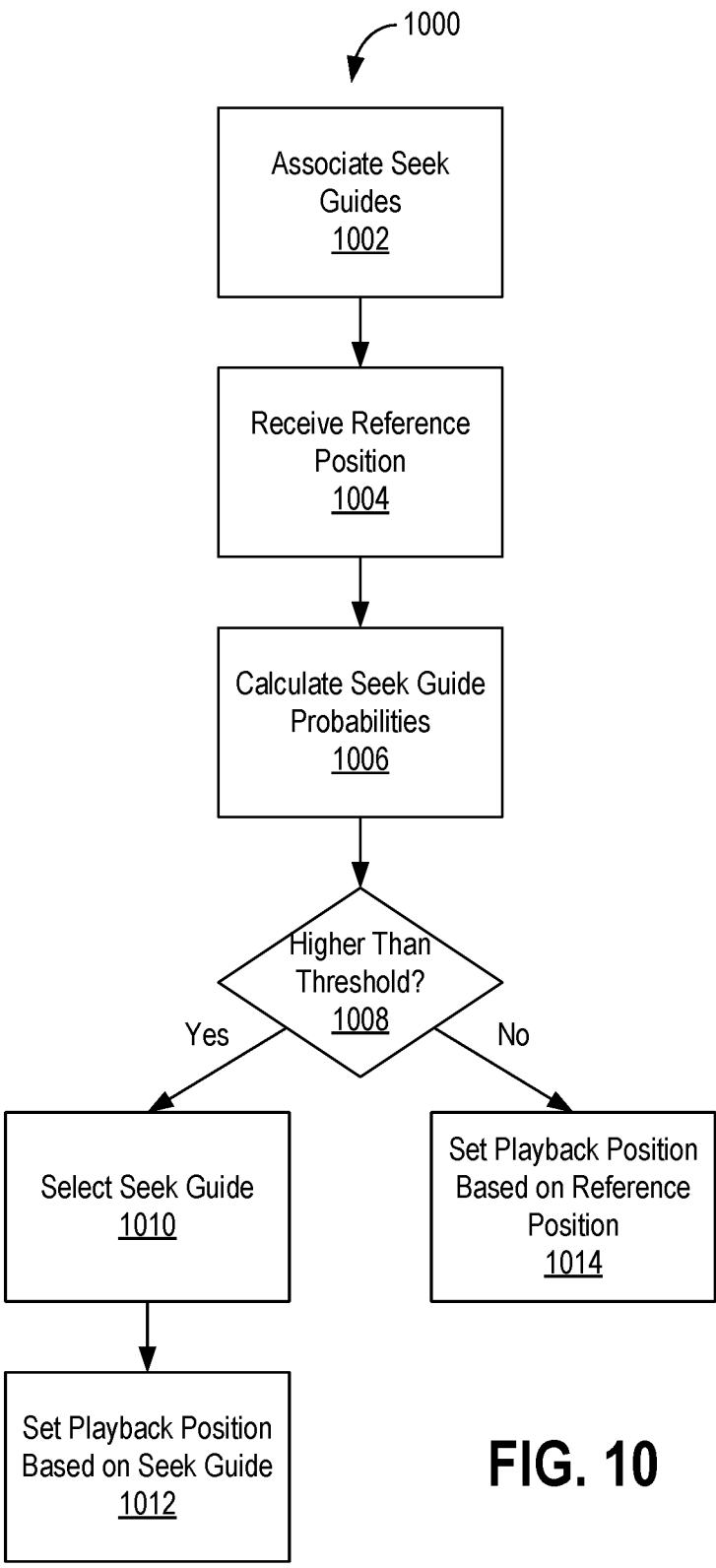
FIG. 10 illustrates a flowchart of a second example method for setting a playback position using seek guides.

FIG. 10 illustrates a second example flowchart of a method 1000 for snapping to seek positions in media content using seek guides. The method 1000 includes operations 1002, 1004, 1006 1008, 1010, 1012, 1014.

The operations 1002, 1004, 1006 are similar to the operation 902, 904, 906 described above to associate one or more seek guides with a media content item, receive a reference position, and calculate probabilities for at least one of the one or more seek guides.

The operation 1008 is performed to compare the calculated probabilities from the operation 1006 to a predetermined threshold. If at least one of the calculated probabilities satisfies a comparison criterion with the predetermined threshold, the method 1000 proceeds to the operation 1010 to select a seek guide, and then to the operation 1012 to set a new playback position based on the selected seek guide, which may be similar to the operations 908, 910 described above. If none of the calculated probabilities satisfies the criterion, the method 1000 proceeds to the operation 1014. In the illustrated embodiment, the calculated probabilities are compared against the predetermined threshold to determine if at least one of the probabilities is greater than or equal to the predetermined threshold.

The operation 1014 is performed to set a playback position based on the reference position received during the operation 1004. As with the operation 910 described above, the operation 1014 may be performed by a seek guide selector, which may cooperate with a media stream service and/or a media playback engine. A user interface may also be updated with the playback position by placing a position indicator at a position on a scrub bar representing the playback position. In some embodiments, the user interface may not need to be updated because the position indicator may already be at the reference position to which the playback position is being set from when a user set the reference position.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method of determining seek positions in media content items, the method comprising:
   associating one or more seek guides with a media content item, each of the one or more seek guides including a position and a radius;
   receiving a request from a user to seek to a reference position in the media content item, wherein the reference position is determined by the user selecting the reference position on a scrub bar;
   establishing a probabilistic distribution at a position determined based on the reference position, wherein establishing the probabilistic distribution at the position determined based on the reference position comprises establishing the probabilistic distribution at a position selected such that the reference position is a mean, median, or mode of the probabilistic distribution;
   selecting a seek guide from the one or more seek guides using the probabilistic distribution, wherein selecting the seek guide from the one or more seek guides includes calculating probabilities for at least one of the one or more seek guides using a cumulative distribution function of the probabilistic distribution; and
   setting a playback position based on the position of the selected seek guide.

2. The method of claim 1, wherein the playback position is set at the position of the selected seek guide.

3. The method of claim 1, wherein the probabilistic distribution has a mean at the reference position, and wherein selecting the seek guide from the one or more seek guides further includes:
   ranking the at least one of the one or more seek guides based on the calculated probabilities; and
   selecting the seek guide based on the ranking.

4. The method of claim 3, wherein the selected seek guide has a highest calculated probability from among the calculated probabilities.

5. The method of claim 1, wherein a standard distribution of the probabilistic distribution is based, at least in part, on a type of user device.

6. The method of claim 1, wherein the probabilistic distribution is a normal distribution.

7. The method of claim 1, wherein the probabilistic distribution has a mean at the reference position.

8. A system for determining seek positions in media content items, the system comprising:
   one or more processors; and
   one or more computer-readable storage devices storing data instructions that, when executed by the one or more processors, cause the system to:
      associate one or more seek guides with a media content item, each of the one or more seek guides including a position and a radius;
      receive a request from a user to seek to a reference position in the media content item, wherein the reference position is determined by the user selecting the reference position on a scrub bar;

establish a probabilistic distribution at a position determined based on the reference position, wherein establishing the probabilistic distribution at the position determined based on the reference position comprises establishing the probabilistic distribution at a position selected such that the reference position is a mean, median, or mode of the probabilistic distribution;

calculate probabilities for at least one of the one or more seek guides using a cumulative distribution function of the probabilistic distribution and set a playback position based on the probabilistic distribution and the one or more seek guides.

9. The system of claim 8, wherein setting the playback position based on a probabilistic distribution and the one or more seek guides includes:

comparing the calculated probabilities to a predetermined threshold; and if one or more of the calculated probabilities is greater than or equal to the predetermined threshold selecting a seek guide with a highest calculated probability from among the calculated probabilities greater than or equal to the predetermined threshold; and setting the playback position based on the position of the seek guide, or if none of the calculated probabilities are greater than or equal to the predetermined threshold:

setting the playback position to the reference position.

10. The system of claim 9, wherein each of the one or more seek guides is assigned to a layer.

11. The system of claim 10, wherein the radius of each seek guide is based on the layer to which the seek guide is assigned.

12. The system of claim 10, wherein a first layer represents starts of words and a second layer represents starts of sentences.

13. A non-transitory computer-readable medium having stored thereon data instructions that, when executed by one or more processors, cause the one or more processors to:

associate one or more seek guides with a media content item, each of the one or more seek guides including a position and a radius;

receive a request from a user to seek to a reference position in the media content item, wherein the reference position is determined by the user selecting the reference position on a scrub bar;

establish a probabilistic distribution at a position determined based on the reference position, wherein establishing the probabilistic distribution at the position determined based on the reference position comprises establishing the probabilistic distribution at a position selected such that the reference position is a mean, median, or mode of the probabilistic distribution;

select a seek guide from the one or more seek guides using the probabilistic distribution, wherein selecting the seek guide from the one or more seek guides includes calculating probabilities for at least one of the one or more seek guides using a cumulative distribution function of the probabilistic distribution; and set a playback position based on the position of the selected seek guide.

14. The non-transitory computer-readable medium of claim 13, wherein the probabilistic distribution is a skewed distribution.

15. The non-transitory computer-readable medium of claim 13, wherein the probabilistic distribution has a mean at the reference position, and wherein selecting the seek guide from the one or more seek guides further includes:

ranking the at least one of the one or more seek guides based on the calculated probabilities; and selecting the seek guide based on the ranking.

16. The non-transitory computer-readable medium of claim 15, wherein the selected seek guide has a calculated probability that is greater than or equal to a predetermined threshold.

17. The non-transitory computer-readable medium of claim 13, wherein a standard deviation of the probabilistic distribution is based, at least in part, on a size of a screen of a user device.

18. The non-transitory computer-readable medium of claim 13, wherein the position for each of the one or more seek guides is based on transcription data of the media content item.

* * * * *